US007960875B2

(12) United States Patent
Higuchi

(10) Patent No.: US 7,960,875 B2
(45) Date of Patent: Jun. 14, 2011

(54) VIBRATION GENERATOR

(75) Inventor: Shinichi Higuchi, Fukushima-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 923 days.

(21) Appl. No.: 11/866,592

(22) Filed: Oct. 3, 2007

(65) Prior Publication Data

US 2008/0089168 A1 Apr. 17, 2008

(30) Foreign Application Priority Data

Oct. 16, 2006 (JP) ................................. 2006-281175

(51) Int. Cl.
*B06B 1/04* (2006.01)
*H02K 33/00* (2006.01)

(52) U.S. Cl. ............................... 310/15; 310/21; 310/36

(58) Field of Classification Search .................... 310/15, 310/36, 21, 29

See application file for complete search history.

(56) References Cited

U.S. PATENT DOCUMENTS 5,546,069 A * 8/1996 Holden et al. ............ 340/407.1
5,650,763 A * 7/1997 McKee et al. .............. 340/407.1
7,652,399 B2 * 1/2010 Lee ............................ 310/67 R
7,755,227 B2 * 7/2010 Hirashima ...................... 310/36
2008/0089168 A1 * 4/2008 Higuchi ........................ 366/116

FOREIGN PATENT DOCUMENTS

JP 2005-095740 4/2005
JP 2006-128401 * 5/2006

* cited by examiner

*Primary Examiner* — Karl I Tamai

(74) *Attorney, Agent, or Firm* — Brinks Hofer Gilson & Lione

(57) ABSTRACT

There is provided a small-sized vibration generator that resonates at two different frequencies. A movable base is housed inside a case. The movable base has an installation plate, and supporting plates bent at right angles from both ends of the installation plate. A first elastically deformable portion is formed integrally with the installation plate, and a weight body is supported by the first elastically deformable portion. In the movable base, a second elastically deformable portion is provided between the installation plate and the supporting plates, and the supporting plates are fixed to supporting end plates of the case. The bending elastic modulus of the second elastically deformable portion is higher than the bending elastic modulus of the first elastically deformable portion, and resonates at two natural frequencies when a driving force is applied to the weight body by a magnetically-driven portion.

4 Claims, 3 Drawing Sheets

VIBRATION GENERATOR

CLAIM OF PRIORITY

This application claims benefit of the Japanese Patent Application No. 2006-281175 filed on Oct. 16, 2006, which is hereby incorporated by reference.

BACKGROUND

1. Field of the Invention

The present invention relates to a vibration generator in which a weight body is vibrated by a driving force applied to the weight body from a magnetically-driven portion composed of a coil and a magnet, and more specifically, to a vibration generator in which resonance points of vibration are set to two frequencies.

2. Description of the Related Art

Various electronic devices such as a controller of a mobile phone or game machine and the like are provided with a vibration generator. The vibration generator has a weight body that is supported by a spring in a small case. One of a coil and a magnet, composing a magnetically-driven portion, is supported by the weight body, and the other is provided in the case side. When an alternating current is applied to the coil, a vibration driving force is applied to the weight body from the magnetically-driven portion such that the weight body is vibrated.

In this type of vibration generator, the frequency of the alternating current applied to the coil of the magnetically-driven portion is caused to coincide with a natural frequency determined by the mass of the weight body and the elastic modulus of the spring. Then, the weight body can resonate, thereby obtaining large amplitude of vibration.

In the conventional vibration generator, a resonance frequency is set to one point. Therefore, when the frequency of an alternating signal applied to the coil greatly deviates from the natural frequency, the vibration amplitude of the weight body during vibration cannot be increased. Further, when the resonance frequency is set to one point, the vibration generator can only generate one kind of vibration, and cannot generate two kinds of vibrations having vibration frequencies that are different from each other.

SUMMARY

According to an aspect of the invention, a vibration generator includes a movable base formed of a substrate; a weight body supported by the movable base; and a magnetically-driven portion that applies a vibration to the weight body. First and second elastically deformable portions are formed integrally with the movable base. The weight body is supported through the first elastically deformable portion. The movable base is supported by a case through the second elastically deformable portion. The magnetically-driven portion is provided between the movable base and the weight body. The bending elastic modulus of the second elastically deformable portion is different from that of the first elastically deformable portion, and a natural frequency when the weight body is vibrated by a driving force applied to the weight body from the magnetically-driven portion is different from a natural frequency when the movable base is vibrated by a reaction force to the driving force.

The vibration generator of the aspect of the invention has two natural frequencies. Therefore, the frequency of an alternating current to be applied to the magnetically-driven portion can be widened, and a vibration with a relatively large amplitude can be generated in a wide frequency band of the alternating current applied to the coil. Further, as the frequency of the alternating current applied to the coil is switched, two kinds of vibrations can be generated on the basis of two natural frequencies.

In one embodiment of, an installation plate and a supporting plate bent from the installation plate are formed integrally with the movable base, the first elastically deformable portion is formed by a portion of the installation plate, the second elastically deformable portion is formed between the installation plate and the supporting plate, one of a coil and a magnet constituting the magnetically-driven portion is fixed to the movable base, and the other of the coil and the magnet is fixed to the weight body.

The vibration generator of this embodiment has two kinds of elastically deformable portions constructed by the substrate composing the movable base. Therefore, it is possible to simply construct a vibration generator having two kinds of natural frequencies, of which the size is reduced.

DESCRIPTION OF THE EMBODIMENTS

Preferred embodiments of the present invention will now be described with reference to the drawings.

Figure 1:
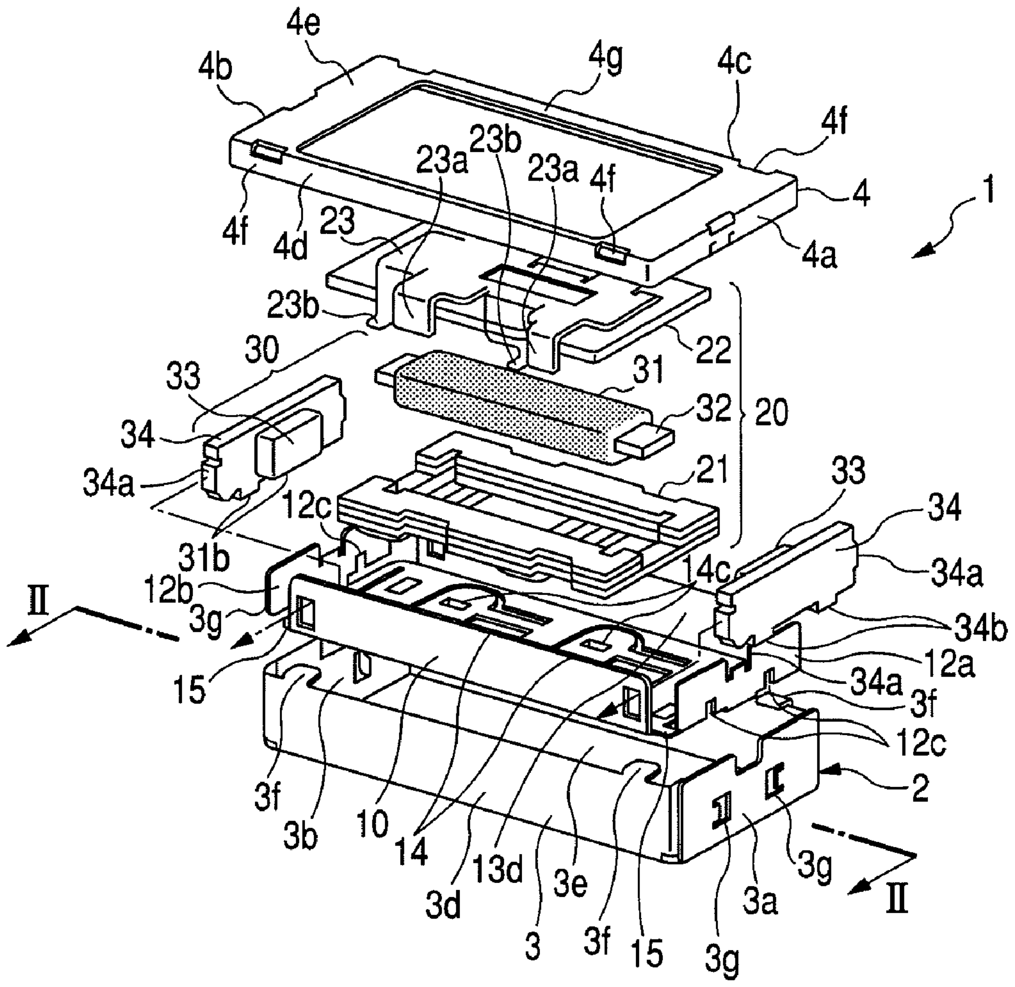
FIG. 1 is an exploded perspective view of a vibration generator according to an embodiment.
Figure 2:
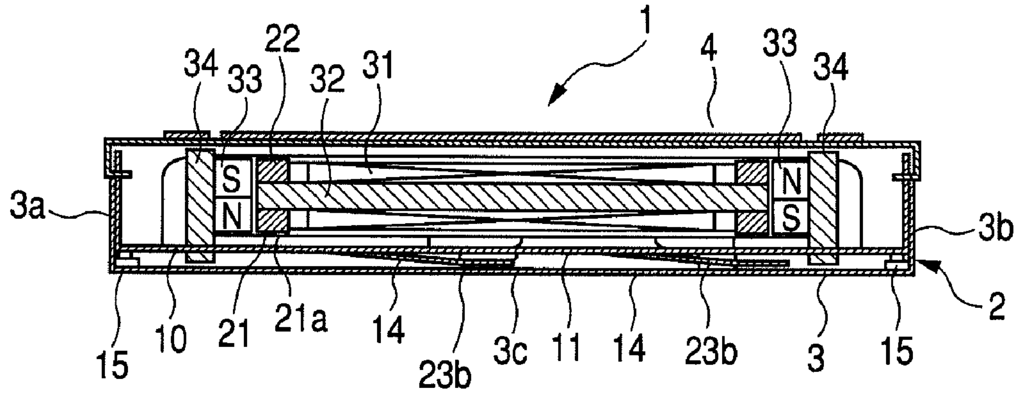
FIG. 2 is a cross-sectional view taken along II-II line of FIG. 1, showing a state where the vibration generator shown in FIG. 1 is assembled.
Figure 3A:
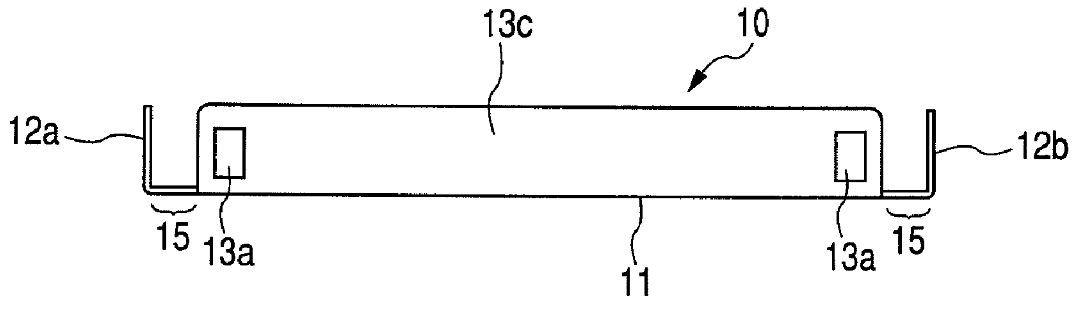
FIG. 3A is a side view of a movable base.
Figure 3B:
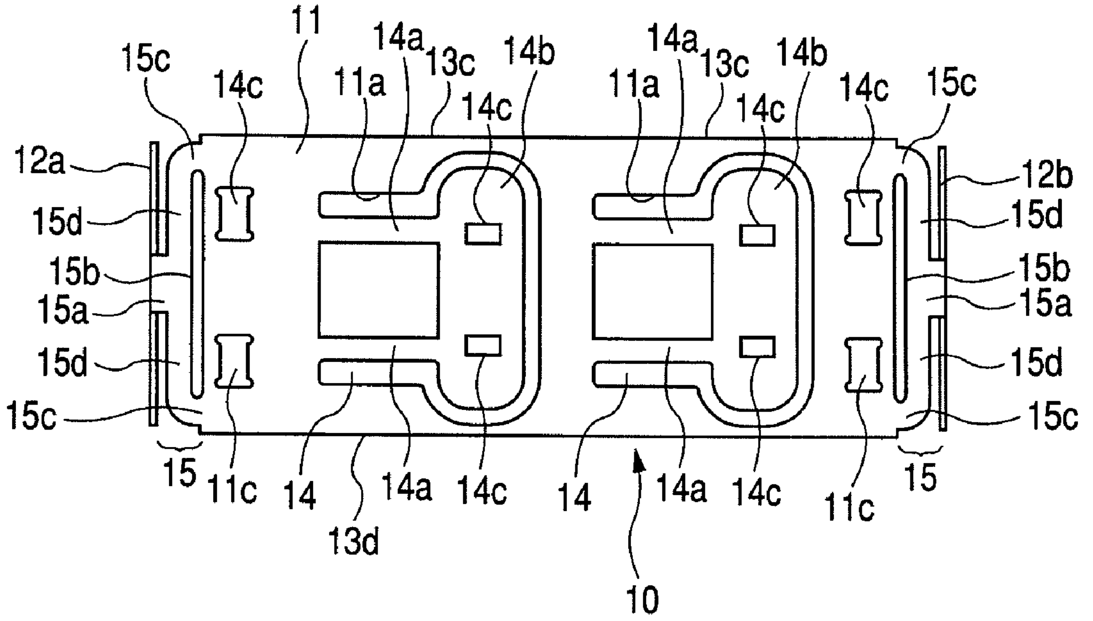
FIG. 3B is a bottom view of the movable base.

FIG. 1 is an exploded perspective view of a vibration generator according to an embodiment. FIG. 2 is a cross-sectional view taken along II-II line of FIG. 1, showing a state where the vibration generator shown in FIG. 1 is assembled. FIG. 3A is a side view of a movable base composing the vibration generator shown in FIG. 2, and FIG. 3B is a bottom view of the movable base.

As shown in FIGS. 1 and 2, the vibration generator 1 has an elongated cubical case 2. The case 2 has a lower case 3 and an upper case 4, which are formed of a metal plate. The lower plate 3 includes supporting end plates 3*a* and 3*b* which are formed in parallel to face each other, side plates 3*c* and 3*d* which connects both side portions of the supporting end plates 3*a* and 3*b*, and a bottom plate 3*e*. The supporting end plates 3*a* and 3*b* and the side plates 3*c* and 3*d* are bent at right angles from the bottom plate 3*e*.

The upper case 4 is formed of a metal plate and has a planar shape formed in a rectangle. The upper case 4 has end surface bending pieces 4*a* and 4*b* formed in the short side thereof and side surface bending pieces 4*c* and 4*d* formed in the long side thereof. The end surface bending pieces 4*a* and 4*b* are stacked on the outside of the supporting end plates 3*a* and 3*b* of the lower case 3, and the side surface bending pieces 4*c* and 4*d* are stacked on the outside of the side plates 3*c* and 3*d*. Then, the upper case 4 is assembled onto the lower case 3. Further, as a plurality of claws 3*f*, which are integrally formed in the upper periphery of the lower case 3, are bent within a plurality of engagement holes 4*f* formed in the upper case 4, the lower case 3 and the upper case 4 are fixed.

The upper case 4 has a ceiling plate 4*e* provided therein. The ceiling plate 4*e* has a rectangular opening 4*g* passing from the top to the bottom.

Inside the case 2, a movable base 10 is housed. The movable base 10 is integrally formed of a metal plate. The movable base 10 may be formed of a magnetic metal plate, but is preferably formed of a non-magnetic metal plate. For example, the movable base 10 may be formed of resin.

As shown in FIGS. 3A and 3B, the movable base 10 has a rectangular installation plate 11. From both ends of the installation plate 11, a pair of supporting plates 12*a* and 12*b* are bent at right angles. The supporting plates 12*a* and 12*b* are disposed in parallel to face each other. When the movable base 10 is housed into the case 2, the supporting plate 12*a* closely contacts the inner surface of the supporting end plate 3*a* of the lower case 3, and the supporting plate 12*b* closely contacts the inner surface of the supporting end plate 3*b* of the lower case 3. As shown in FIG. 1, the supporting end plate 3*a* of the lower case 3 has a pair of claws 3*g* facing inwardly, and the supporting plates 12*a* and 12*b* of the movable base 10 have a pair of positioning grooves 12C formed therein. As the claws 3*g* are inserted into the positioning grooves 12*c* so as to be bent, the supporting plate 12*a* is positioned and fixed inside the supporting end plate 3*a*, and the supporting plate 12*b* is positioned and fixed inside the supporting end plate 3*b*.

The movable base 10 has a pair of side pieces 13*c* and 13*d* bent at right angles from the respective long sides thereof in both sides of the installation plate 11. In a state where the movable base 10 is housed into the case 2 and the supporting plates 12*a* and 12*b* of the movable base 10 are fixed to the inner surfaces of the supporting end plates 3*a* and 3*b* of the lower case 3, the side pieces 13*c* and 13*d* respectively face the inner surfaces of the side plates 3*c* and 3*d* of the lower case 3 in positions where the side pieces 13*c* and 13*d* are sufficiently separated from the inner surfaces. At this time, as shown in FIG. 2, the installation plate 11 of the movable base 10 faces the inner surface of the bottom plate 3*e* of the lower case 3 in a position where the installation plate 11 is sufficiently separated from the inner surface.

As shown in FIG. 3B, the installation plate 11 of the movable base 10 has a pair of first elastically deformable portions 14 and 14 provided therein. The first elastically deformable portions 14 and 14 are integrally formed in a portion of the metal plate composing the movable base 10. The installation plate 11 has a pair of notched portions 11*a* and 11*a* formed therein. A metal plate composing the installation plate 11 extends into the notched portion 11*a*. In the metal plate, a pair of deformable arms 14*a* and 14*a*, which compose the first elastically deformable portion 14 and are parallel to each other, and a fixing portion 14*b* integrated with the respective deformable arms 14*a* and 14*a*. When an external force does not act on the first elastically deformable portion 14, the deformation portions 14*a* and the fixing portion 14*b* are positioned on the same plane as the installation plate 11. Further, the fixing portion 14*b* has a pair of fixing holes 14*c*.

In the movable base 10, second elastically deformable portions 15 are provided between the installation plate 11 and the supporting plates 12*a* and 12*b* in both sides of the installation plate 11. In the installation plate 11, the side pieces 13*c* and 13*d* are bent in both side portions thereof. The bending rigidity of the installation plate 11 reinforced by the side pieces 13*c* and 13*d* is increased. Further, the supporting plates 12*a* and 12*b* are fixed to the supporting end plates 3*a* and 3*b* of the lower case 3. In the movable base 10, portions of the installation plate 11, where the side pieces 13*c* and 13*d* are not provided and the supporting plates 12*a* and 12*b* are excluded, mainly function as the second elastically deformable portions 15 and 15.

In the second deformation portion 15, the width (cross-sectional area) thereof decreases at a bent portion 15*a* where the supporting plate 12*a* or 12*b* is bent. Inside the bent portion 15*a*, a slit 15 extending in a straight line in a widthwise direction thereof is formed, and small-width portions 15*c* and 15*c* are formed in both sides of the slit 15. Further, between the bent portion 15*a* and the small-width portions 15*c* and 15*c*, thin pieces 15*d* and 15*d* are respectively formed. In the second elastically deformable portion 15, the bent portion 15*a*, the small-width portions 15*c* and 15*c*, and the thin pieces 15*d* and 15*d* can be elastically deformed. However, lower portions of the supporting plates 12*a* and 12*b* are deformed so as to be slightly separated inwardly from the supporting end plates 3*a* and 3*b* of the lower case 3. Further, the lower portions of the supporting plates 12*a* and 12*b* may function as portions of the first elastically deformable portions 14 and 14.

In the respective first elastically deformable portions 14, the pair of elongated deformable arms 14*a* mainly contribute to a bending elastic modulus. In the second elastically deformable portions 15, the bent portion 15*a*, the small-width portions 15*c* and 15*c*, and the side pieces 15*d* and 15*d* mainly contribute to a bending elastic modulus. In the structure of the movable base 10 shown in FIG. 3, the bending elastic modulus of the second elastically deformable portion 15 is larger than that of the first elastically deformable portion 14.

As shown in FIGS. 1 and 2, a weight body 20 is housed in the case 2. The weight body 20 is constructed by assembling a lower half body 21 and an upper half body 22. A magnetic core material 32 composing a magnetically-driven portion 30 and a coil 31 wound around the core material 32 are interposed and housed between the lower half body 21 and the upper half body 22.

On the top surface of the upper half body 22, a fixing bracket 23 is provided. The fixing bracket 23 has holding pieces 23*a* and 23*a* provided in both sides thereof, the support pieces 23*a* and 23*a* being bent at right angles. The lower half body 21 is held by the holding pieces 23*a* and 23*a*. In both sides of the fixing bracket 23, fixing pieces 23*b* and 23*b* are respectively provided, which are bent at right angles in a position closer to the core material 32 than the respective holding pieces 23*a* and 23*a*. As shown in FIG. 2, the fixing pieces 23*b* and 23*b* extend further downward from a bottom surface 21*a* of the lower half body 21. The lower ends of the fixing pieces 23*b* and 23*b* are inserted into the fixing holes 14*c* opened in the fixing portion 14*b* of the first elastically deformable portion 14 and are then bent. Accordingly, the fixing pieces 23*b* are fixed to the fixing portions 14*b* of the respective first elastically deformable portions 14.

As shown in FIG. 2, in a state where the fixing pieces 23*b* of the fixing bracket 23 are fixed to the fixing portions 14*b* and 14*b* of the first elastically deformable portions 14 and 14, a sufficient clearance is provided between the installation plate 11 of the movable base 10 and the bottom surface of the weight body 21, that is, the bottom surface of the lower half body 21. Further, when the deformable arms 14*a* of the first elastically deformable portions 14 are deformed in a downward direction as indicated by dashed lines of FIG. 2, a region where the weight body 20 moves downwardly can be secured.

As shown in FIG. 1, the area of the opening 4*g* formed in the upper case 4 of the case 2 is set to be larger than the shape of the weight body 20. Therefore, when the deformable arms 14*a* of the first elastically deformable portions 14 are deformed upwardly, the weight body 20 can be prevented from directly hitting the upper case 4.

The magnetically-driven portion 30 is provided between the weight body 20 and the movable base 10. As described above, the core material 32 and the coil 31 composing the magnetically-driven portion 30 are held within the weight body 20. Meanwhile, magnets 33 composing the magnetically-driven portion 30 are fixed to the inner surfaces of brackets 34 and 34 formed of a magnetic material.

The bracket 34 has projections 34*a* ad 34*a* formed in both sides thereof, the projections 34*a* and 34*a* being inserted into the fixing holes 13*a* and 13*a* opened in the side pieces 13*c* and 13*d* of the movable base 10. Further, the bracket 34 has projections 34*b* and 34*b* formed in the lower side thereof, the projections 34*b* and 34*b* being inserted into the fixing holes 11*c* and 11*c* opened in the installation plate 11 of the movable base 11.

As shown in FIGS. 3A and 3B, the fixing holes 13*a* and 11*c* are formed in the inside from the second elastically deformable portions 15 and 15. Accordingly, the bracket 34 is fixed in the inside from the second elastically deformable portions 15.

As shown in FIG. 2, both end surfaces of the core material 32 respectively face the magnets 32 positioned in both sides of the magnetically-driven portion 30. In the surfaces of the magnets 33 and 33 facing the core material 32, the upper half and the lower half of each surface have a different magnetic pole. Accordingly, when an alternating current is applied to the coil 31, a driving force in a top-to-bottom direction of FIG. 2 acts on the weight body 20 in which the coil 31 is held, and a reaction force to the driving force acts on the installation plate 11 of the movable base 10.

Figure 4:
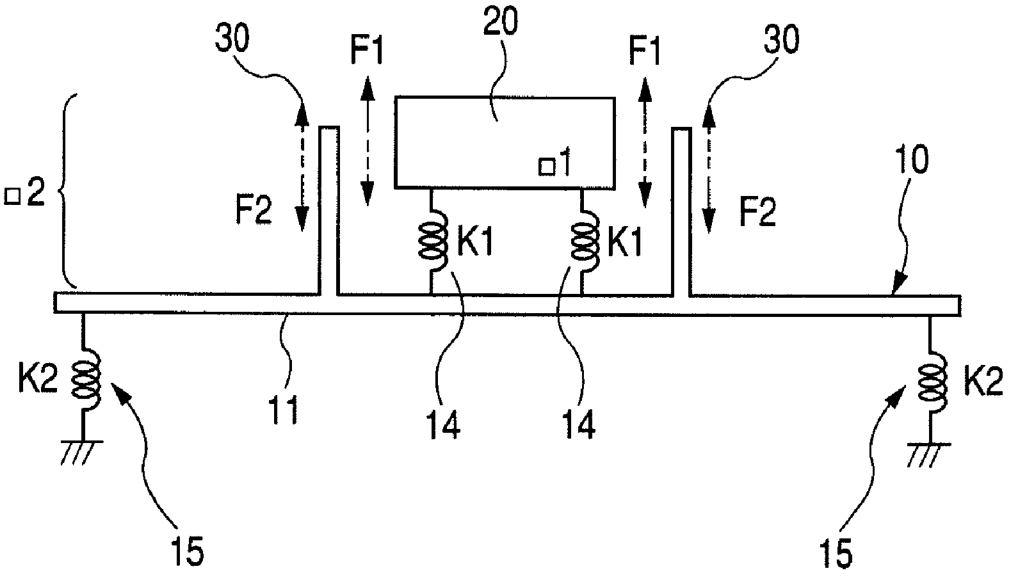
FIG. 4 is a schematic view of a vibration module of the vibration generator.

FIG. 4 is a schematic view of a vibration module of the vibration generator 1.

The vibration generator 1 has two resonant frequencies during vibration. One of the resonant frequencies corresponds to a first natural frequency f1 which is determined by a bending elastic modulus k1 of the first elastically deformable portion 14 formed in the movable base 10 and the mass m1 of the weight body 20. The other of the resonant frequencies corresponds to a second natural frequency f2 which is determined by a bending elastic modulus k2 of the second elastically deformable portion 15 formed in the movable base 10 and an overall mass m2 on the installation plate 11 of the movable base 10, that is, the mass of the weight body 20 and the magnetically-driven portion 30 mounted on the installation plate 11.

Figure 5:
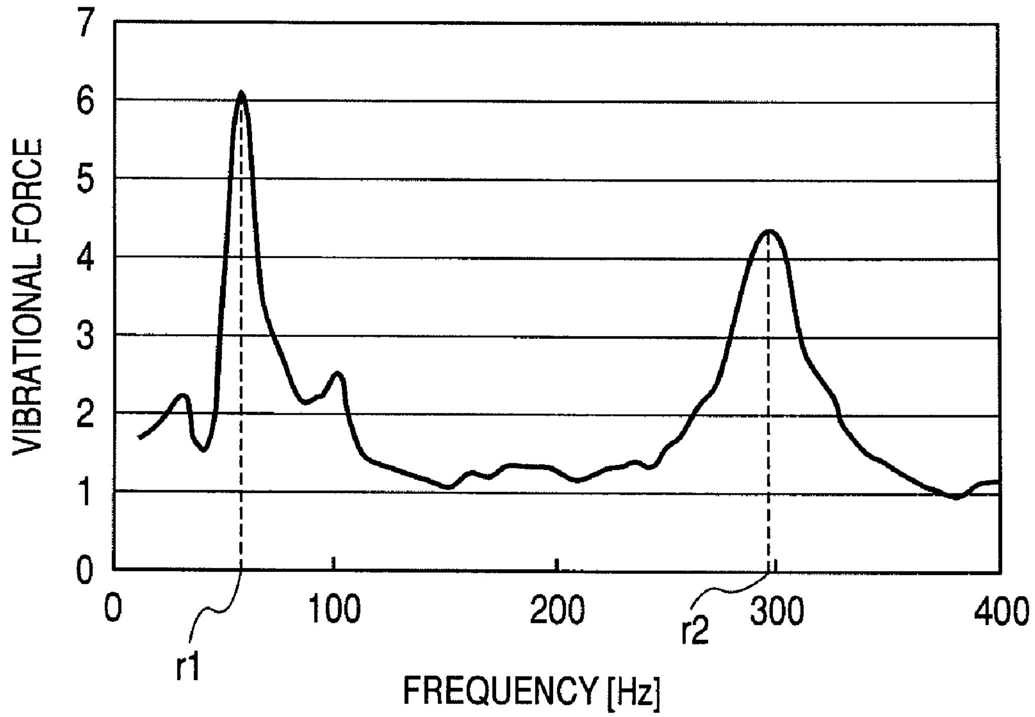
FIG. 5 is a diagram for explaining the resonance frequency of the vibration generator.

In this embodiment, the bending elastic modulus k2 of the second elastically deformable portion 15 formed in the movable base 10 is larger than the bending elastic modulus k1 of the first elastically deformable portion 15. Further, the second natural frequency f2 is higher than the first natural frequency f1. As shown in FIG. 5, the first natural frequency f1 is about 60 Hz, and the second natural frequency f2 is about 300 Hz, for example.

When an alternating current is applied to the coil 31, the core material 32 of the vibration generator is magnetized. At this time, the magnetic poles of both end surfaces of the core material 32 are switched in accordance with the frequency of the current. As shown in FIG. 2, the magnets 33 and 33 facing both end surfaces of the core material 32 are magnetized in such a manner that different magnetic poles are arranged in the top-to-bottom direction. Therefore, a vibration driving force F1 in the top-to-bottom direction is applied from the magnets 33, fixed to the movable base 10, to the weight body 20 which holds the coil 31 and the core material 32. Further, a reaction force F2 to the vibration driving force F1 applied to the weight body 20 acts on the installation plate 11 of the movable base 10.

When the frequency of the alternating current applied to the coil 31 coincides with the first natural frequency f1 determined by the first bending elastic modulus of the first elastically deformable portion 14 and the mass m1 of the weight body 20 or approximates the first natural frequency f1, the weight body 20 resonates. Further, even when the frequency of the alternating current applied to the coil 31 coincides with the second natural frequency f2 determined by the bending elastic modulus k2 of the second deformation portion 15 and the total mass m2 on the movable base 10 or approximates the second natural frequency f2, the installation plate 11 of the movable base 10, the weight body 20, and the magnetically-driven portion 30 resonate together.

As such, when two kinds of frequency bands of driving signals are applied, resonance is achieved in the respective frequency bands. Further, since the first and second natural frequencies f1 and f2 are different from each other, two kinds of generated vibrations have different vibration sounds or propagation states. Therefore, in a controller of a mobile equipment or game machine, a variety of vibrations can be performed. For example, when a certain operation is performed, resonance is achieved at the frequency f1, and when another operation is performed, resonance is achieved at the frequency f2.

In addition, in a state the first natural frequency f1 and the second natural frequency f2 are set to approximate each other, and when a signal with a certain wide-band frequency including both of the first and second frequencies f1 and f2 is applied to the coil 31, resonance can be achieved. In other words, the frequency band of a current, required when the vibration generator 1 resonates, can be widened.

In this embodiment, the magnets 33 are mounted on the installation plate 11 of the movable base 10, and the vibration driving force F1 is applied to the weight body 20 supported by the first elastically deformable portion 14 on the movable base 10, and the installation plate 11 is vibrated by the reaction force to the vibration driving force F1. Therefore, only one magnetically-driven portion 30 may be provided, which makes it possible to reduce the overall size of the vibration generator.

Further, the coil may be disposed in the side of the installation plate 11, and the magnets may be mounted in the side of the weight body 20. Contrary to this embodiment, the bending elastic modulus of the first deformation portion 14 may be set to be larger than that of the second deformation portion 15, and the first natural frequency determined by the mass of the weight body and the bending elastic modulus of the first elastic deformation may be set to be higher than the second natural frequency determined by the bending elastic modulus of the second elastically deformable portion 15 and the mass on the installation plate 11.

What is claimed is:

1. A vibration generator comprising:

a movable base formed of a substrate;

a weight body supported by the movable base; and a magnetically-driven portion that applies a vibration to the weight body, wherein first and second elastically deformable portions are formed integrally with the movable base, the weight body is supported through the first elastically deformable portion, the movable base is supported by a case through the second elastically deformable portion, the magnetically-driven portion is provided between the movable base and the weight body, the bending elastic modulus of the second elastically deformable portion is different from that of the first elastically deformable portion, and a natural frequency when the weight body is vibrated by a driving force applied to the weight body from the magnetically-driven portion is different from a natural frequency when the movable base is vibrated by a reaction force to the driving force:

wherein the first elastically deformable portion has a deformable arm formed of the substrate and a fixing portion, which is formed on the side of a free end of the deformable arm and to which the weight body is fixed, and the second elastically deformable portion is formed by reducing the area of the substrate between the installation portion and the supporting plate.

2. The vibration generator according to claim 1, wherein an installation plate and a supporting plate bent from the installation plate are formed integrally with the movable base, the first elastically deformable portion is formed by a portion of the installation plate, the second elastically deformable portion is formed between the installation plate and the supporting plate, one of a coil and a magnet constituting the magnetically-driven portion is fixed to the movable base, and the other of the coil and the magnet is fixed to the weight body.

3. The vibration generator according to claim 1, wherein the bending elastic modulus of the second elastically deformable portion is larger than that of the first elastically deformable portion, and the natural frequency when the movable base is vibrated by the reaction force to the driving force is higher than the natural frequency when the weight body is vibrated by the driving force applied to the weight body from the magnetically-driven portion.

4. The vibration generator according to claim 1, wherein the substrate is formed of a metal plate.

* * * * *